Figure 4:
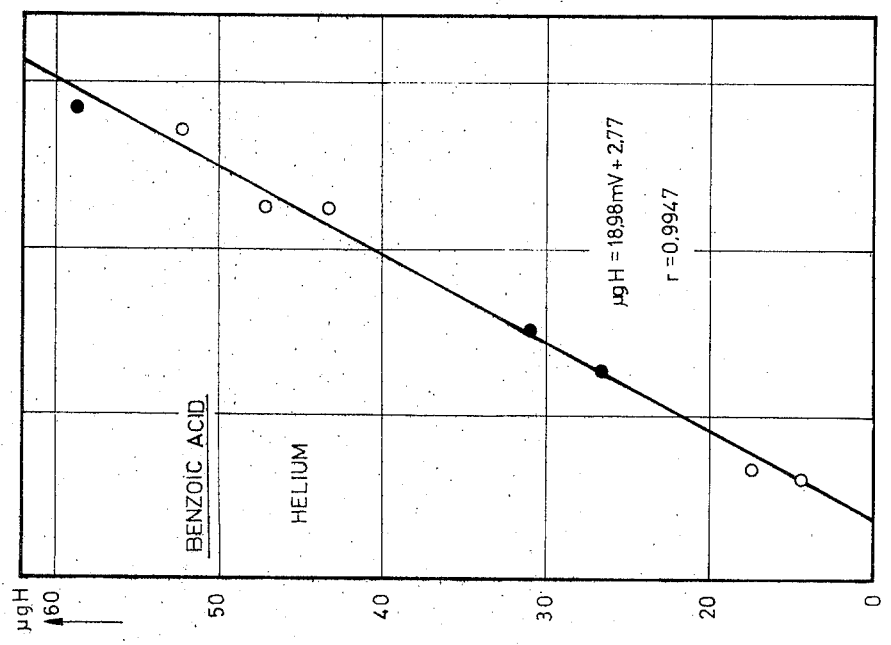

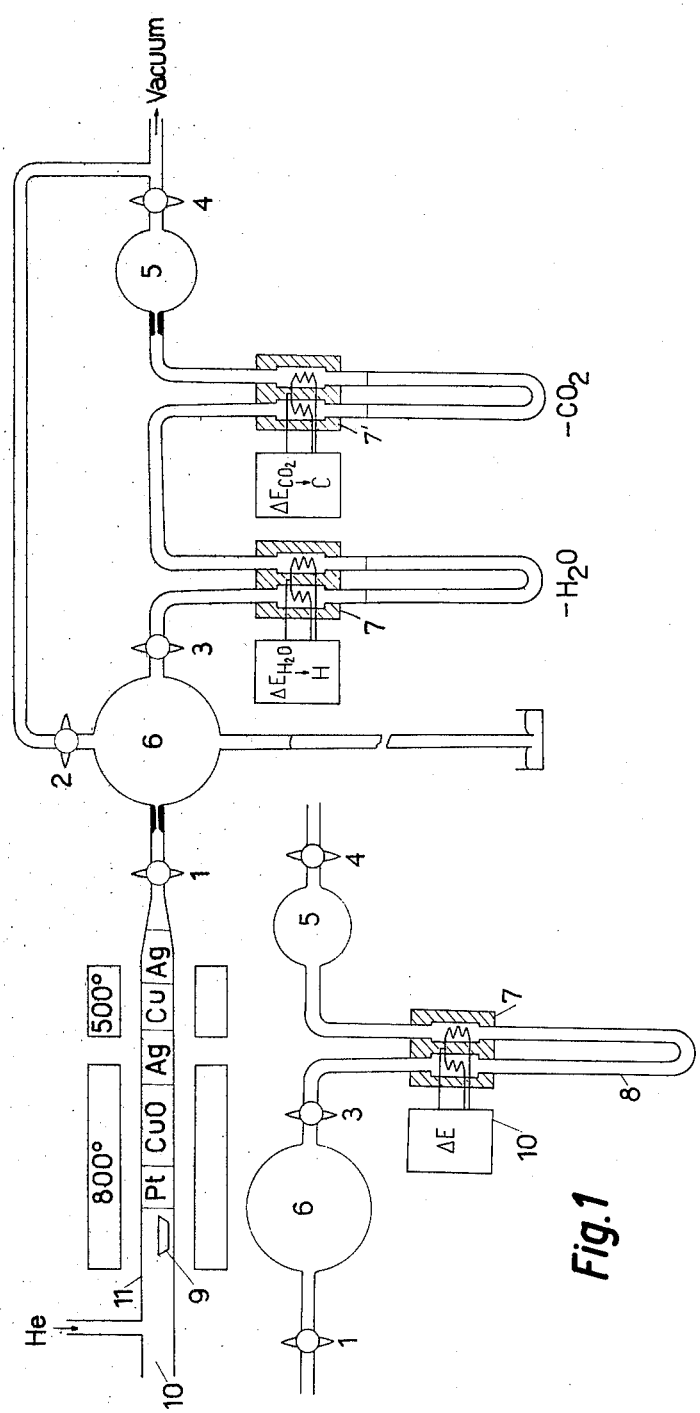

United States Patent Office 3,252,759
Patented May 24, 1966

3,252,759
QUANTITATIVE ANALYSIS OF GASEOUS
MIXTURES
Wilhelm Simon, Buchzelgstrasse 50,
Zurich 7/53, Switzerland
Filed Nov. 8, 1962, Ser. No. 236,340
Claims priority, application Switzerland, Nov. 9, 1961,
13,030/61
7 Claims. (Cl. 23—230)

This invention relates to a method of quantitatively analysing gaseous mixtures, and to a device for carrying out such analysis. It is particularly concerned with analysis using thermal conductivity analysers, also known as katharometric analysis. It is preferably applied to gaseous mixtures containing one or more rapidly and quantitatively removable components.

Existing katharometric methods and devices for the quantitative analysis of gaseous mixtures are all based on the measurement of a function of the concentration of the component to be determined against time as the mixture passes through a thermal conductivity analyzer. Integration of this function by approximation methods such as planimetering, computation by approximating equations, or by more accurate methods such as electronically controlled integrators, is then carried out to give the total amount of the component. Objections to this technique are the low accuracy obtained by the approximation methods or the very high costs of integrators adapted to give more accurate results.

The method according to the invention essentially comprises providing a defined volume of known temperature and pressure of the gaseous mixture to be analyzed and containing at least one rapidly and quantitatively removable component, expanding said mixture into an evacuated system where it passes a first thermal conductivity analyzer, then a means which quantitatively removes one component and subsequently a second thermal conductivity analyzer, and as soon as a steady state is reached comparing the output signals of the two analyzers to give a differential signal which is proportional to the amount of said removed component.

Since this measurement is performed in a steady state and integration with respect to time is not necessary, accurate results are given even with the very low costs of the simple device described below. The gaseous mixture may be any mixture containing at least one easily removable component. In certain instances the gases to be analyzed require a pre-treatment transferring at least one component into an easily removable substance. Examples for quantitative removal of one component from the mixture are adsorption, absorption, and cold trapping. If the mixture contains more than one component rapidly and quantitatively removable by different means it can then be passed in turn through a number of pairs of analyzers corresponding to the number of components, each pair of analyzers being connected on opposite sides of a device for quantitatively removing the corresponding component.

The device according to the invention for carrying out this method comprises two thermal conductivity analyzers or two ducts of one thermal conductivity analyzer connected in series across (i.e., in front of and behind) a means for quantitatively removing one component of the mixture, and a means indicating the difference of the output signals of the two analyzers. For analysis of more than one component a number of such devices are connected in series.

Figure 3:
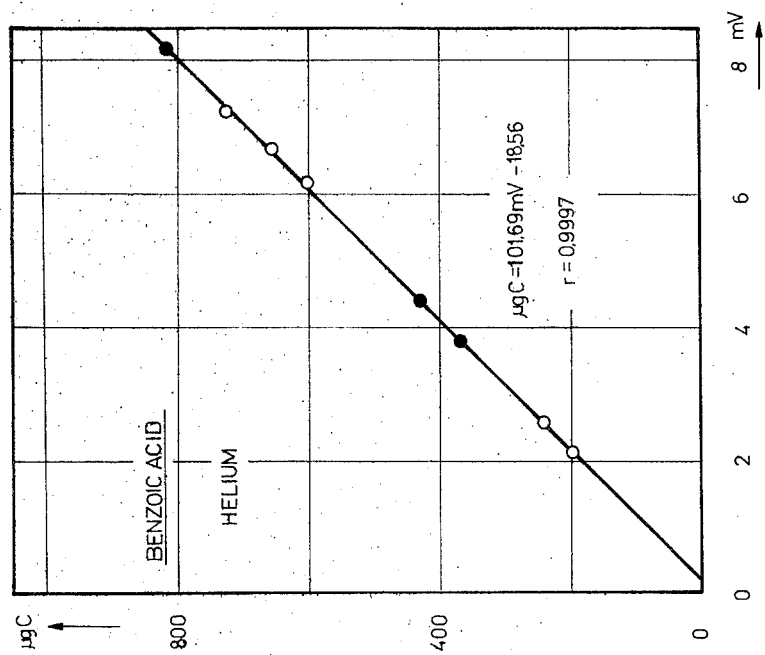

Two embodiments of the present invention will now be described in more detail, by way of examples, with reference to the accompanying drawings in which:

FIGURE 1 shows one form of the device;
FIGURE 2 shows another form of the device; and
FIGURES 3 and 4 are graphs obtained with the device of FIGURE 2.

FIGURE 1 shows a device for use in quantitatively determining a single component of a gaseous mixture. The device includes a thermal conductivity analyzer (katharometer) 7 having two ducts which are connected by pipe 8, in which removal of the gas component to be determined occurs. The two ducts of the analyzer 7 are electrically connected to a joint measuring instrument 10. A gas reservoir 6 fitted with a manometer (see FIG. 2) is disposed in front of this system and connected with the first duct, and a pressure-balancing vessel 5 is connected with the second duct of the analyzer. Entry and exit of gas to and from the system are controlled by cocks 1 and 4, and passage of gas mixture from the reservoir into the analyzers is controlled by a cock 3. The system consisting of the analyzer, the gas removing device, and the pressure-balancing vessel is evacuated for use. In use the mixture provided in the reservoir 6 is allowed to expand from the reservoir 6 into said system. As soon as a pressure balance has been established the differential signal of the two ducts of the katharometer is measured. By use of calibration data this signal can be interpreted quantitatively.

The device as described above has many applications. For example it is adapted for analysis of the carbon dioxide content in the atmosphere, for quantitative determination of individual components in various industrial flue gases, and for the analysis of combustion products of organic compounds. Besides, e.g. the oxygen content of organic compounds can be determined by vaporization of the respective substance in helium at a temperature of e.g. 900° C., conversion of the oxygen to carbon monoxide in presence of carbon at 1100° C. and subsequent quantitative analysis of the carbon monoxide.

For simultaneous analysis of several components of a gaseous mixture a number of katharometers are connected in series as shown in FIGURE 2. One application of such multiple apparatus is in the micro-analysis of carbon and hydrogen, in organic compounds. Such analysis has in the past been performed gravimetrically, gas-volumetrically, conductometrically, mass-spectrometrically. Of these methods the most generally used is the gravimetric method and none of the others have really been a satisfactory replacement for this. Analysis according to the invention is not only a satisfactory replacement for gravimetric analysis but from some aspects it has distinct advantages over this process. For example it allows much smaller specimens of the substances to be used and gives results using one milligramme specimens which have equal accuracy to results obtained gravimetrically and for which specimens of 3 to 4 milligrammes must be used. Furthermore the time spent for a single analysis is no greater than that for conventional gravimetric analysis, the cost of the apparatus according to the invention is low, and the method according to the invention does not require any special requirements with respect to the skill of the analyst so that the amount of error is very low.

To perform a carbon-hydrogen analysis a sample of the substance to be analyzed is placed, together with an oxygen-releasing compound such as cobalt oxide or potassium chlorate, in a platinum vessel 9 within a combustion tube 10 previously filled with oxygen and then is burned. The combustion products together with an appropriate inert gas, after removal of surplus oxygen by reduction by passage over copper, are led via cock 1 into the reservoir 6, which as well as the whole system comprising the katharometers 7 and 7', and pressure-balancing vessel 5 was evacuated prior to use. The capacity of reservoir 6 is about 100 cc. and is big enough to collect all the combustion products. When the manometer connected to 6 shows a given pressure cock 1 is closed. By opening cock 3 the combustion products pass through the two katharometers, each with their associated absorption devices absorbing water and carbon dioxide respectively, and then to the pressure-balancing vessel 5 provided with a restriction in the form of a duct with an inner diameter of about 0.1 mm. Removal of water may be performed by means of magnesium perchlorate; removal of carbon dioxide may be effected by means of lithium hydroxide in combination with some magnesium perchlorate placed at the ends of the absorption tube. It was found that a steady state is obtained generally after about 30 seconds, and once this has been established the differential signals of the two katharometers, held by thermostats at a temperature of 25° C.±0.05°, are read. This reading can have an accuracy of ±5 micro-volts. Since the volume of the system, the space between cocks 1 and 4, as well as the pressure of the gas mixture in the vessel 6 prior to opening of the cock 3 are constant, the differential signals from the katharometers are directly proportional to the amounts of the components being determined. The proportionality constants for any gas components are invariant with respect to time and can easily be defined by calibration by combusting appropriate test substances.

In the analysis of organic compounds by combustion and subsequent determination of the combustion products as described above in addition to the carbon and hydrogen determination the nitrogen content can also be determined according to the present method. In this case the use of an inert carrier gas such as helium or the like for the combustion products $H_2O$, $CO_2$ and $N_2$ is necessary. A device for carrying out the nitrogen determination with reference to FIG. 2 preferably is placed between katharometer 8 and balancing vessel 5. Removal of the nitrogen may be effected by reaction with magnesium at about 600° C.

However, by use of an arrangement especially suited for the analysis of less easily removable gases the nitrogen need not necessarily be removed from the gaseous mixture (containing e.g. helium and nitrogen) after passage of the first duct of the corresponding katharometer. The comparison measuring here is effected as follows: The mixture to be analyzed, i.e. helium and nitrogen, is entered into the first duct of the katharometer, while the second duct is provided with helium derived from an extraneous source and adjusted to the appropriate conditions of temperature and pressure. The differential signal given by the measuring instrument as in the aforementioned examples is proportional to the amount of nitrogen contained in the mixture with helium.

The accuracy of the method according to the invention is convincingly shown from the table given below showing the results of carbon and hydrogen analysis of several organic compounds.

| Substance | Weight of sample (mg.) | Percentage of C | | Percentage of H | |
|---|---|---|---|---|---|
| | | Calc. | Found | Calc. | Found |
| Benzoic acid | 0.5370 | 68.84 | 68.50 | 4.95 | 5.04 |
| | 0.6255 | | 68.89 | | 5.06 |
| | 1.1881 | | 68.63 | | 4.79 |
| Acetanilide | 0.6704 | 71.09 | 70.95 | 6.71 | 6.33 |
| p-Nitro-phenol | 0.9033 | 51.80 | 52.21 | 3.62 | 3.71 |
| Benzyl-disulfide | 0.9192 | 68.25 | 68.48 | 5.73 | 5.57 |
| Chlorodinitrobenzene | 1.9102 | 35.58 | 35.60 | 1.49 | 1.45 |
| | 1.5780 | | 35.35 | | 1.42 |

The accuracy of the method is also reflected in the graphs of FIGURES 3 and 4 showing respectively the carbon and hydrogen signals obtained in the combustion of benzoic acid. The linearity of the results is extremely good and the equations of the two curves were found to be:

FIGURE 3: $(\mu g. C) = 101.69$ mv. $- 18.56$
FIGURE 4: $(\mu g. H) = 18.98$ mv. $+ 2.77$

In each of these formulae mv. is the measured difference voltage from the katharometer.

The standard deviations of the results obtained by the present method from the calculated values as to be seen from the table are almost identical with those of the errors of conventional gravimetric micro-methods, although the gravimetric method uses specimens of 3 to 4 milligrammes while the method according to the invention uses specimens of about 1 milligramme.

A complete carbon-hydrogen analysis including weighing in of the sample can easily be performed in about seven minutes, and it is found that the constancy of the measuring equipment is so great that zero calibration need be checked only twice a day.

I claim:
1. A method of quantitatively analyzing a gaseous mixture containing at least one sample component which at least may be converted to a rapidly and quantitatively removable analysis component which comprises:

treating the original gaseous mixture so as to convert substantially all of at least said one sample component to a rapidly and quantitatively removable analysis component:

subsequently providing a defined homogeneous volume at determined temperature and pressure of said treated gaseous mixture to be analyzed now containing at least said one analysis component in rapidly and quantitatively removable condition;

expanding said mixture into a previously evacuated system, thereby passing said mixture through a first thermal conductivity analyzing detector without either separating said mixture or otherwise changing the concentration of said analysis component in said gaseous mixture in any manner, and thereby then passing the resulting mixture through a second thermal conductivity analyzing detector;

removing quantitatively said one analysis component from said mixture after passage through said first detector but before passage through said second detector;

said first detector thereby yielding an output which is a function of the thermal conductivity of said mixture including said one analysis component, and said second detector yielding an output which is a similar function of the thermal conductivity of said mixture after removal of said one analysis component; allowing a steady state to be reached and then comparing the output signals of said two detectors to give a differential signal which is proportional to the total amount of said removed analysis component and therefore also the total amount of the original sample component.

2. A method according to claim 1 in which:
said treated gaseous mixture as analyzed contains a plurality of analysis components rapidly and quantitatively removable by different means;
said treated mixture is passed in turn through a plurality of analyzing detectors corresponding to the number of components to be removed,
each of said analyzing detectors having a first and a second detector duct;
and a different one of said analysis components is quantitatively removed from said analyzed mixture after it has passed through said first duct but before passage through said second duct for each of said analyzing detectors,
whereby each of the differential signals between the two ducts of each of said analyzing detectors is proportional to the total amount of a different one of said analysis components and therefore also the total amount of one of the corresponding original sample components.

3. A method for the micro-analysis of the carbon and hydrogen content of organic substances which comprises:

combusting a defined amount of said substance in the presence of a substance selected from the group consisting of oxygen or oxygen-releasing compounds;

removing surplus oxygen by reduction by passage of the combustion products over copper;

transferring the oxygen-free gaseous combustion products into a previously evacuated known volume reservoir;

expanding said gaseous products of known volume without changing the concentration of both the water vapor and carbon dioxide in said gaseous product mixture at a known temperature and pressure into a system comprising in series a first katharometer having two ducts, a second katharometer having two ducts, a pressure balancing vessel initially under vacuum, and lines connecting said reservoir, said first and second katharometer and said pressure balancing vessel;

removing quantitatively substantially all water vapor from said gaseous combustion products after their passage through one of said ducts of said first katharometer but before their reaching the other duct thereof;

removing substantially all of the carbon dioxide from said gaseous products after their passage through one of said ducts of said second katharometer but before their reaching the other duct of said second katharometer;

the output signals of each of the ducts of each katharometer therefore being a function of the thermal conductivity of the composition of the gas passing therethrough;

and after a steady state is reached comparing the output signals of the two ducts of each katharometer, whereby a differential signal is obtained which is proportional to the amount of water and carbon dioxide respectively contained in the combustion products.

4. A device for use in the quantitative analysis of a sample substance containing at least one sample component which is at least convertible to a rapidly and quantitatively removable gaseous analysis component, comprising in generally series relationship:

means for treating said original sample substance so as to convert substantially all of said one sample component into said rapidly and quantitatively removable gaseous analysis component;

a known volume reservoir having an inlet connected to said treating means and an outlet at the opposite side thereof, each provided with a valve cock;

at least two thermal conductivity analyzing detectors connected directly to the reservoir outlet in series relationship and on opposite sides of a means for quantitatively removing said one analysis component from said treated mixture;

an evacuated pressure-balancing vessel connected to the second of said detectors and having an outlet tube provided with a valve cock, so that said treated gaseous mixture flows into the reservoir, one of said conductivity analyzing detectors, said removing means, the other of said analyzing detectors, and said pressure balancing vessel in that order;

and a means for indicating the difference of the output signals of said two analyzing detectors;

whereby, after a steady state of treated gaseous mixture flow has been reached, a steady indication of the concentration of said gaseous analysis component in said treated gaseous mixture is obtained, yielding directly a signal proportional to the total amount of the corresponding sample component in the original sample substance.

5. A device according to claim 4, in which:

said two analyzing detectors are separate ducts of a single katharometer.

6. A device according to claim 5, in which:

a plurality of katharometers are connected in series, the two ducts of each katharometer being connected on opposite sides of a means for quantitatively removing a different analysis gas component;

and said indicating means determines the difference between the output signals of the two ducts of each katharometer, whereby, after a steady state of treated gaseous mixture flow has been reached, a steady indication of the various concentrations of each of said different gaseous analysis components in said treated gaseous mixture, and therefore of the total amounts of the corresponding different sample components in the original sample substance are obtained.

7. A device according to claim 6, in which:

the first katharometer of the system is connected substantially directly to said reservoir for the treated gas mixture, and the last katharometer of the system is connected substantially directly to said pressure-balancing vessel.

References Cited by the Examiner

UNITED STATES PATENTS

| 1,893,490 | 1/1933 | Beekley. |
| 1,918,702 | 7/1933 | Hebler et al. |
| 2,591,760 | 4/1952 | Zaikowsky. |
| 2,753,246 | 7/1956 | Shields et al. |
| 3,050,372 | 8/1962 | Scott. |
| 3,065,060 | 11/1962 | Roehrig et al. _____ 23—253 |
| 3,096,157 | 7/1963 | Brown et al. _____ 23—232 |

FOREIGN PATENTS 862,674   3/1961   Great Britain.

MORRIS O. WOLK, *Primary Examiner.*

DELBERT E. GANTZ, *Examiner.*